(12) United States Patent
Charlton et al.

(10) Patent No.: US 10,868,984 B1
(45) Date of Patent: Dec. 15, 2020

(54) METHOD FOR ESTIMATING AN IMPROVED CAMERA FINGERPRINT BY IDENTIFYING LOW-MASS PIXEL POSITIONS AND CORRECTING CORRESPONDING FINGERPRINT VALUES

(71) Applicant: The Government of the United States as represented by the Director, National Security Agency, Fort George G. Meade, MD (US)

(72) Inventors: Sarah T. Charlton, Frederick, MD (US); Jeffrey B. Farr, Severn, MD (US)

(73) Assignee: Government of the United States as represented by Director, National Security Agency

( * ) Notice: Subject to any disclaimer, the term of this patent is extended or adjusted under 35 U.S.C. 154(b) by 85 days.

(21) Appl. No.: 16/192,258

(22) Filed: Nov. 15, 2018

(51) Int. Cl.
  *H04N 5/217* (2011.01)
  *H04N 5/357* (2011.01)
  *H01L 27/146* (2006.01)
  *H04N 5/341* (2011.01)
(52) U.S. Cl.
  CPC ....... *H04N 5/357* (2013.01); *H01L 27/14605* (2013.01); *H04N 5/341* (2013.01)
(58) Field of Classification Search
  CPC ... H04N 5/341; H04N 5/357; H01L 27/14605

USPC ......................................................... 348/241
See application file for complete search history.

(56) References Cited

U.S. PATENT DOCUMENTS

| 2004/0096087 | A1* | 5/2004 | Funahashi | G06K 9/001 382/124 |
| 2014/0286546 | A1* | 9/2014 | Shin | G06K 9/00067 382/124 |
| 2015/0178544 | A1* | 6/2015 | Sagiroglu | G06K 9/0008 382/125 |

OTHER PUBLICATIONS

Camera Fingerprint—Matlab implementation 2009, URL: http://dde.binghamton.edu/download/camera_fingerprint/.
Chen, et al., Determining Image Origin and Integrity Using Sensor Noise: IEEE Transactions on Information Security and Forensics 2008: pp. 74-90: vol. 3, Issue 1. IEEE.
Fridrich: Digital Image Forensic Using Sensor Noise: IEEE Signal Processing Magazine; 2009; pp. 26-37: vol. 26, Issue 2, IEEE.

* cited by examiner

*Primary Examiner* — Usman A Khan (57) ABSTRACT

An improved method of determining a camera fingerprint and matching fingerprints is provided. A pixel-wise mass is defined and pixel positions having a low pixel-wise mass are identified. Once identified, the fingerprint values associated with those pixel positions are exchanged with statistically distributed random fingerprint values. Because the replacement values are statistically distributed, an improved fingerprint is provide resulting in improved accuracy of fingerprint matching.

13 Claims, 8 Drawing Sheets

FIG. 4c         410

METHOD FOR ESTIMATING AN IMPROVED CAMERA FINGERPRINT BY IDENTIFYING LOW-MASS PIXEL POSITIONS AND CORRECTING CORRESPONDING FINGERPRINT VALUES

FIELD OF THE INVENTION

This invention is generally directed to an improved method for estimating a camera fingerprint.

BACKGROUND OF THE INVENTION

Digital cameras provide an array of pixels associated with an array of pixel positions. These pixels are used to capture images and video frames. Each image or frame created by a digital camera is represented by an array of pixel values representing the level of brightness, color etc. experienced by the pixel at the corresponding pixel position when the image or frame was captured. Every digital camera imparts a subtle "signature" or "fingerprint" on the images or frames it captures. This fingerprint comes from the light-sensing chip (either a CCD or CMOS) inside the camera. These chips vary ever so slightly from one another due to both the manufacturing process and the properties of the silicon from which they are produced.

Typically several images or frames are used to construct a camera fingerprint. However, a fingerprint can be extracted from a single image or frame if necessary. A basic camera fingerprinting and matching workflow provides:

(1) For each image or frame in a reference set of images or frames created with a particular camera, isolating the noise residual using a de-noising filter to provide an array of noise residual values for each image, where each noise residual value is associated with a pixel position;

(2) Combining the noise residual values associated with the individual images or frames to provide an array of fingerprint values representing an estimate of the camera fingerprint;

(3) Repeating steps 1-2 for a second set of one or more images or frames; and (4) Using a correlation-based score, determining whether the first and second sets of images or frames were generated by the same camera.

Figure 1A:
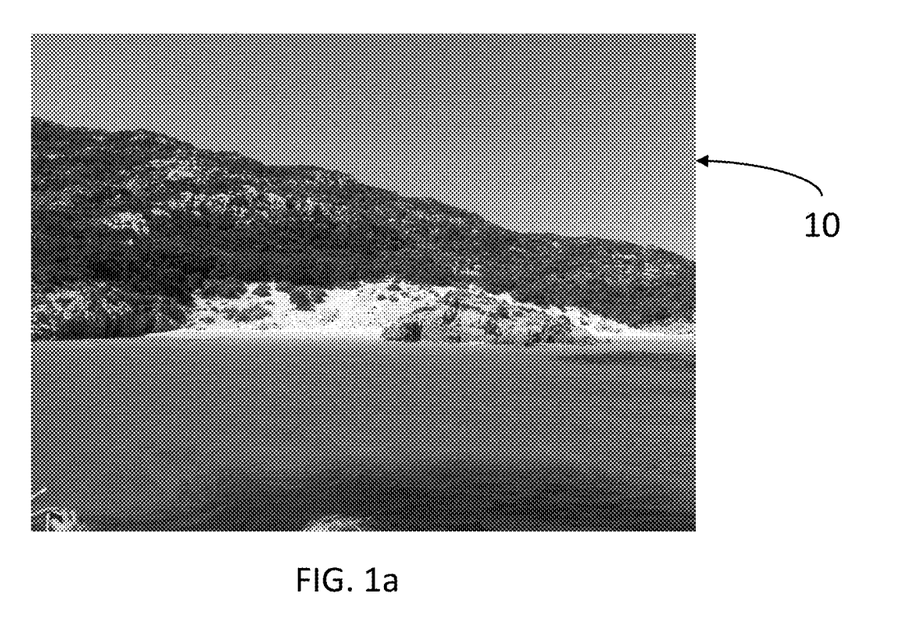
FIG. 1a illustrates a sample image including pixels which are suitable for fingerprinting and pixels which are not suitable for fingerprinting.
Figure 1B:
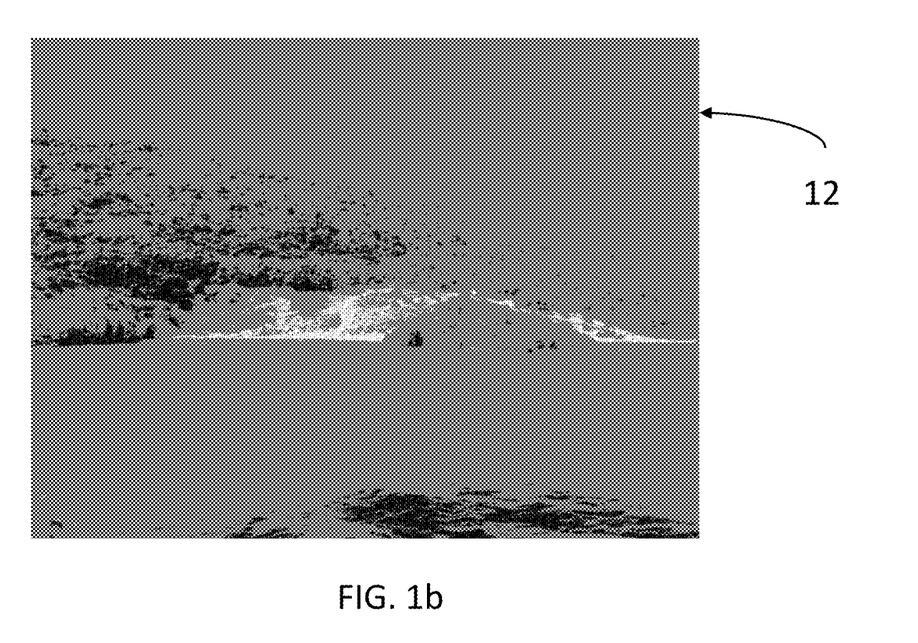
FIG. 1b provides an image corresponding to the image of FIG. 1a and which illustrates the location of pixels of FIG. 1a which are too bright for fingerprinting, too dark for fingerprinting, and suitable for fingerprinting.
Figure 1C:
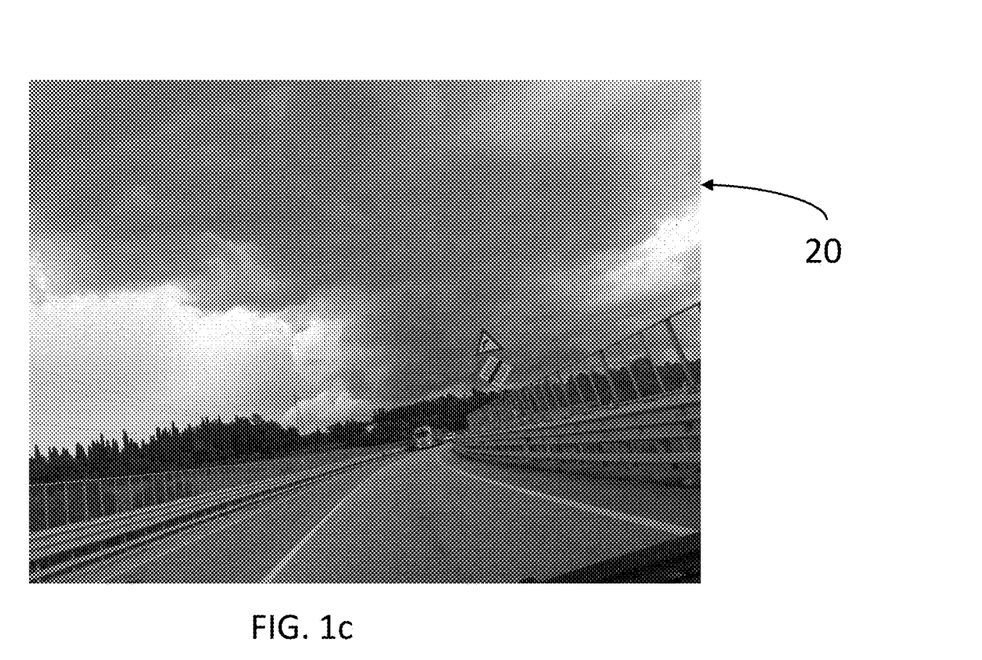
FIG. 1c illustrates a sample image including pixels which are suitable for fingerprinting and pixels which are not suitable for fingerprinting.
Figure 1D:
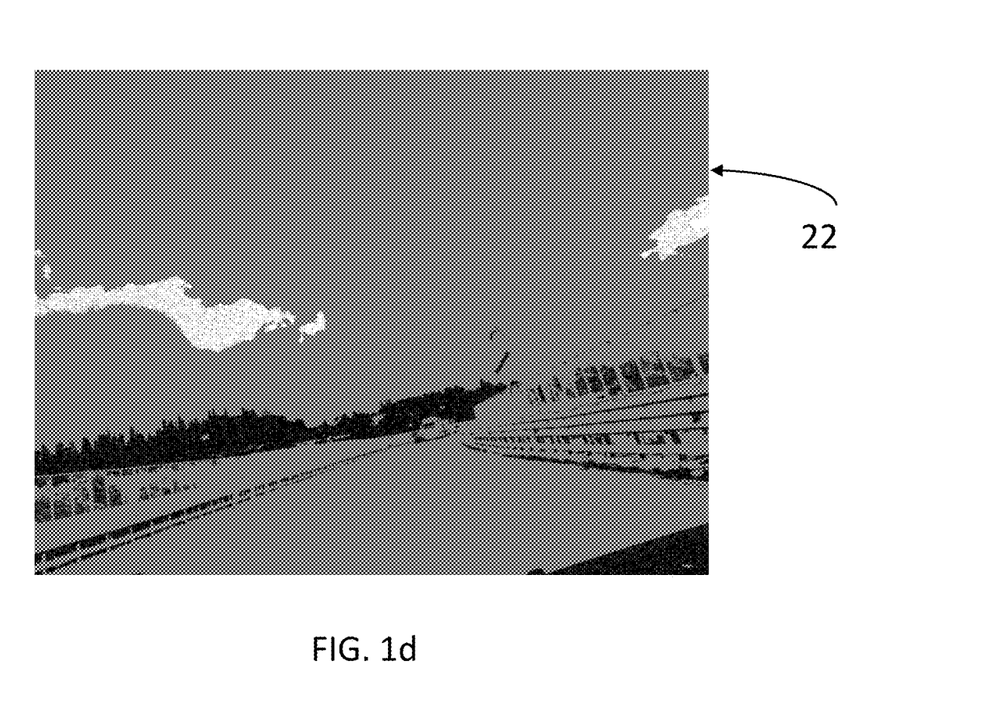
FIG. 1d provides an image corresponding to the image of FIG. 1c and which illustrates the location of pixels of FIG. 1c which are too bright for fingerprinting, too dark for fingerprinting, and suitable for fingerprinting.
Figure 1E:
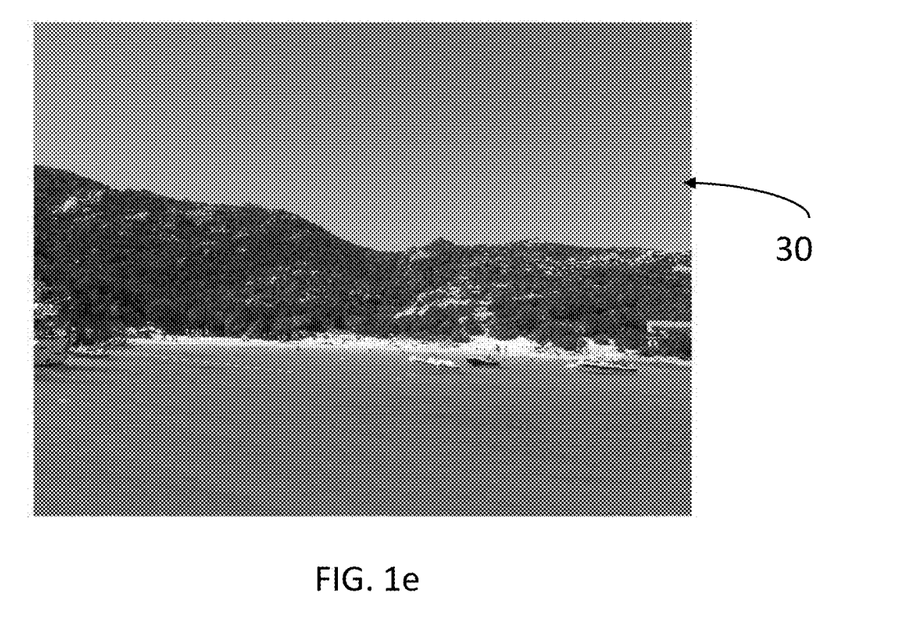
FIG. 1e illustrates a sample image including pixels which are suitable for fingerprinting and pixels which are not suitable for fingerprinting.
Figure 1F:
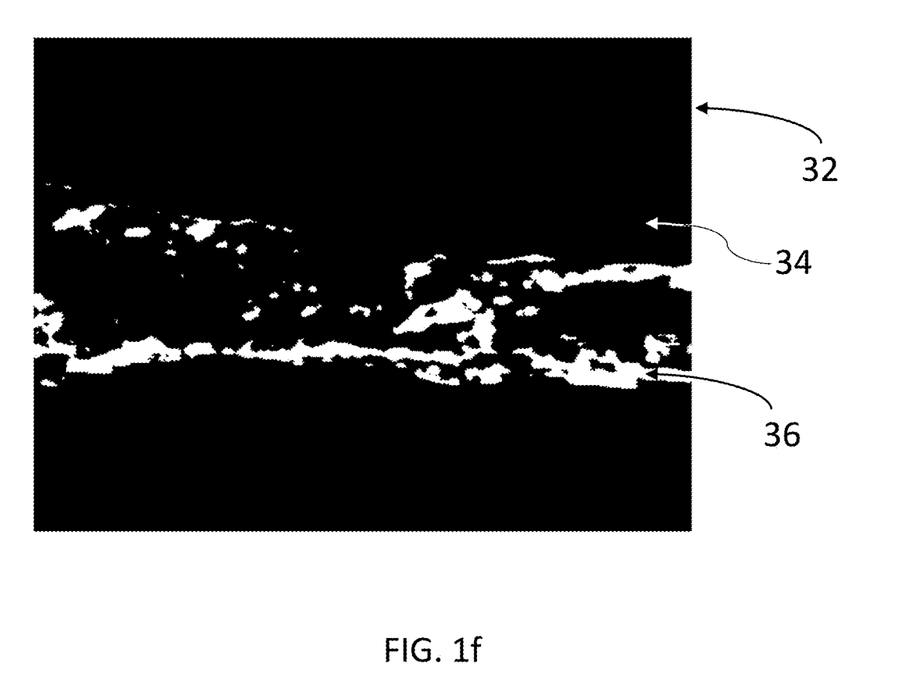
FIG. 1f provides an image corresponding to the image of FIG. 1e and which illustrates the location of pixels of FIG. 1f which are too textured for fingerprinting and the location of pixels which are suitable for fingerprinting.

Not all pixel values of an image are suitable for use in camera fingerprinting. If a pixel value is extreme, it does not express its inherent fingerprint very well. For example, pixel values may be extreme because the pixel is too bright or too dark. Pixel values may also be extreme because the pixel values are too "textured". Pixel which are too textured may be identified by a statistical variance or entropy associated with the pixel values. FIGS. 1a, 1c, and 1e each illustrate an image 10, 20, 30 including extreme pixel values. Each image 1a and 1c includes pixels which are too dark and pixels which are too bright. FIG. 1b provides an image 12 which illustrates the location of the pixels of FIG. 1a which are suitable for fingerprinting and the location of the pixels of FIG. 1a which are not suitable for fingerprinting. Specifically, pixels from FIG. 1a which have been identified as too dark are represented as black pixels in FIG. 1b; pixels which have been identified as too bright are represented as white pixels in FIG. 1a; and pixels which are suitable or fit for use in fingerprinting are represented as gray pixels in FIG. 1b. FIG. 1d provides an image 22 which illustrates the location of the pixels of FIG. 1c are suitable for fingerprinting and the location of the pixels of FIG. 1c which are not suitable for fingerprinting. Specifically, pixels from FIG. 1c which have been identified as too dark are represented as black pixels in FIG. 1d; pixels which have been identified as too bright are represented as white pixels in FIG. 1d; and pixels which are suitable or fit for use in fingerprinting are represented as gray pixels in FIG. 1d. The image of FIG. 1e includes pixels which are too textured. FIG. 1f provides an image 32 which illustrates the location of the pixels of FIG. 1e which are suitable for fingerprint and the location of pixels of FIG. 1e which are not suitable for fingerprinting, Specifically, pixels from FIG. 1e which have been identified as too textured are represented by white regions 34 and pixels which are not too textured and therefore a suitable or fit for use in fingerprinting are represented by black regions 36.

As part of the step of combining noise residual values to provide fingerprint values, these extreme pixel values (e.g., pixel values indicating the pixel at the corresponding position is too dark or too bright or too textured) are masked from a noise residual. Thus, the resulting fingerprint is calculated without using these extreme pixel values. This practice of masking extreme pixel values (i.e., those pixel values not falling within an acceptable range) from the noise residuals used in the camera fingerprint calculation is included in work by Binghamton University. The published literature provides that masking of one or more extreme pixel values is accomplished by replacing the noise residual value at the pixel position associated with the extreme pixel value with the value zero. In many cases, these masked pixel values cause the fingerprint to be ill-formed resulting in erroneous fingerprint matching. A false match, for example, indicates the same camera was used to create two different images or frames or sets of images or sets of frames when in fact two different cameras were used. A failed match indicates that the images or frames were created with two different cameras when in fact the images or frames were created with the same camera.

Problems in the fingerprint caused by extreme pixel values is exacerbated when the extreme pixel values are not distributed at random across the image or set of images or video frames. A lack of random distribution occurs, for example, when multiple images or frames have similar characteristics. If, for example, a group of images includes headshots of a number of individuals, wherein the individuals are seated in the same position (e.g. next to a dark wall) each time an image is captured, the same regions of the image may include extreme pixels. Likewise, when a video is captured, often sequential frames of the video will include similar features and therefore extreme pixels will be provided in the same regions of sequential frames. The lack of randomness provided by these similar images or frames reduces the randomness of the distribution of the extreme pixels, which reduces the randomness of the distribution of masked pixels in the noise residuals. If extreme pixels are masked with value zero, the probability of erroneous fingerprint matching is increased.

SUMMARY OF THE INVENTION

Briefly, the present invention discloses an improved method for estimating a camera fingerprint using a pixel-wise mass. The pixel-wise mass is used to identify low-mass pixel positions and high-mass pixel positions. A variability of fingerprint values associated with the high-mass pixel positions is determined and used to generate statistically distributed random values. The fingerprint values associated with the low-mass pixel positions are then replaced with the randomly generated values to create an improved fingerprint. Use of the improved fingerprint results in greater fingerprint matching accuracy.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Camera fingerprinting theory relies on the fact that many pixels in an image or frame are used to create a camera fingerprint. As noted above, prior fingerprinting techniques provide for the masking of extreme pixel values from noise residuals in order to provide an improved camera fingerprint estimate. When too many pixel values are masked however, the fingerprint estimate is not improved but rather the unmasked pixel values lead to a poor fingerprint estimate. Although a camera fingerprint can be provided using a single image or frame, greater accuracy in matching is achieved when many images are used to create a camera fingerprint. Earlier work by Applicant and described in U.S. Pat. No. 9,525,866 formalized the concept of a "fingerprint mass" as a number of images used to construct a camera fingerprint. High-mass fingerprints have been found to behave according to a known statistical distribution.

This invention extends the fingerprint mass concept to a "pixel-wise mass." Each image or frame within a set of images or frames provides a pixel value corresponding to each pixel position. For each pixel position, the pixel value may fall within an acceptable range and is therefore suitable for fingerprinting or the pixel value may be an extreme value (i.e., the pixel value falls outside the acceptable range) and is determined to be unsuitable for fingerprinting. When estimating a fingerprint for a set of images, a pixel-wise mass for each pixel position is determined. The pixel-wise mass for a pixel position represents the number of pixel values associated with the pixel position which fall within the acceptable range. The pixel-wise mass for each pixel position can vary between zero and N, where N is the fingerprint mass. A pixel-wise mass of zero indicates that none of the images or frames used to estimate the fingerprint included a pixel value for the corresponding pixel position that was within the acceptable range. A pixel-wise mass of N indicates that all of the images or frames used to calculate the fingerprint, included a pixel value for the corresponding pixel position that was within the acceptable range.

Applicant has discovered that the pixel-wise mass can vary substantially from the overall fingerprint mass. Although high-mass fingerprints generally behave according to known statistical distributions, Applicant has discovered that low-mass pixel positions do not behave in accordance with the known statistical distribution. If a fingerprint includes too many low-mass pixel positions, the fingerprint is not well-formed. These ill-formed camera fingerprints lead to erroneous fingerprint matching results, e.g. false matches or failed matches.

Figure 2A:
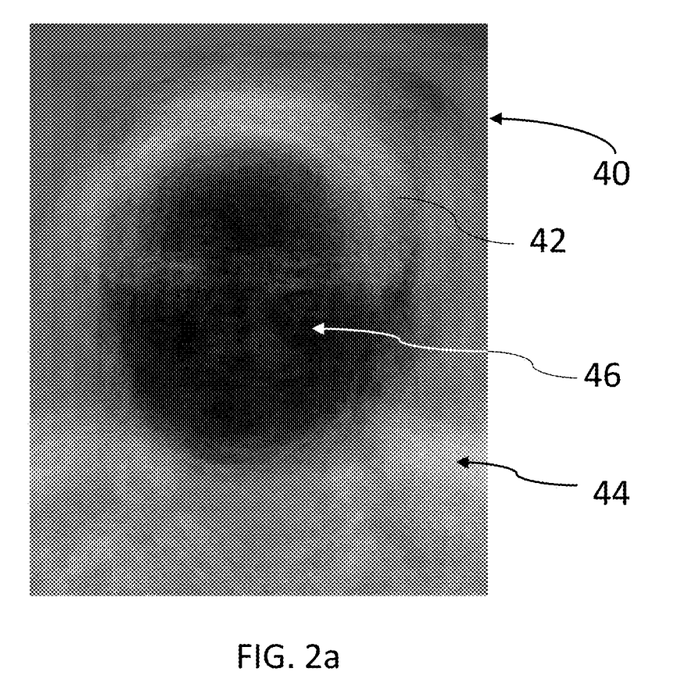
FIG. 2a is a heat map illustrating pixel-wise mass values associated with a set of images.
Figure 2B:
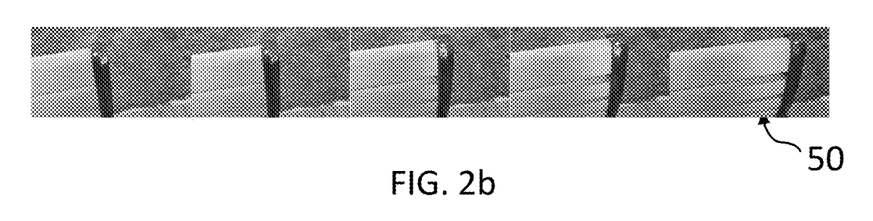
FIG. 2b illustrates an example of a set of video frames.
Figure 2C:
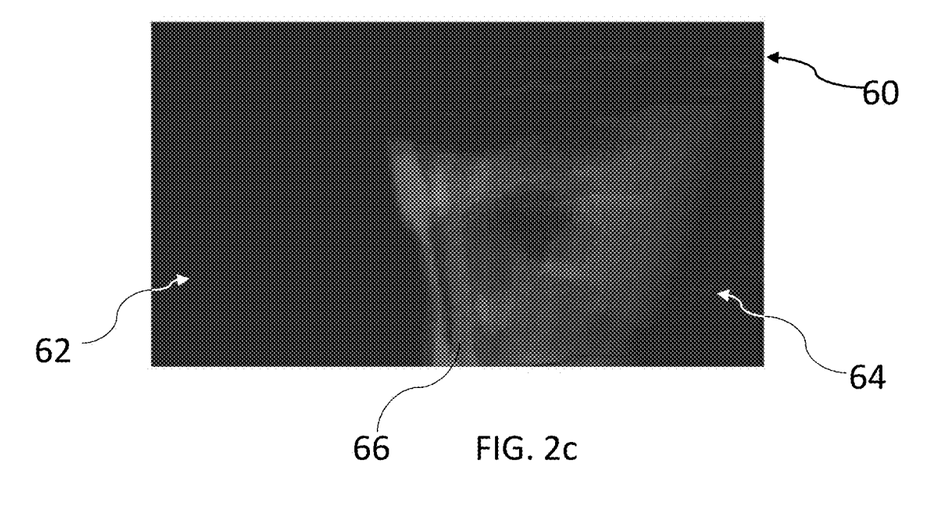
FIG. 2c is a heat map illustrating pixel-wise mass values associated with a set of video frames.

FIG. 2a provides a heat map which illustrates pixel-wise masses for each pixel position associated with a set of images used to form an estimated fingerprint. As illustrated in FIG. 2a, each pixel position is shaded in accordance with the pixel-wise mass associated with the pixel position. Those pixel positions having the highest pixel-wise mass are provided the darkest shading and those pixel positions having the lowest pixel-wise mass are provided the lightest shading. It is noted that in the example illustrated, the high and low mass pixel positions do not appear to be randomly distributed throughout the pixel positions. FIG. 2a illustrates an arc-shaped light area 42 in the upper portion of the map 40 which includes several low mass pixel positions and an area 44 near the lower portion of the map 40 which includes more low mass pixel positions. In the center portion of the map a generally circularly shaped area 46 is provided which includes several high mass pixel positions. The concentration of high and low mass areas indicate that similarities exist in the images of the set used to create the map. The set of images used to create this heat map provides a number of headshots wherein many pixel values within the acceptable range are associated with pixel positions at the center of the area (likely associated with the faces of the individuals) and extreme pixel values are present around this center area (likely associated with the hair of the individuals which was too dark or too bright) and at the bottom portion of the map (likely associated with clothing which was too dark or too bright, perhaps due to reflection of a flash off of lightly colored clothing, for example). FIG. 2b illustrates a set of video frames 50. Each frame in the set of video frames is similar. In particular, it is noted that the image of each frame includes a portion of a bench with a black end support. FIG. 2c is a heat map 60 which illustrates pixel-wise masses for each pixel position associated with a set of video frames used to form an estimated fingerprint, including the frames illustrated in FIG. 2b. As illustrated in FIG. 2c, each pixel position is shaded in accordance with the pixel-wise mass associated with the pixel position. It is noted that the high and low mass pixel positions do not appear to be randomly distributed throughout the pixel positions. High-mass pixel positions appear to be concentrated in a left region 62 and in a right region 64 and low-mass pixel positions appear to be concentrated in a central region 66 which extends toward the right side of the heat map. These low-mass pixel positions in the central region 66 appear to result from the dark pixel values associated with the black end support of the bench illustrated in the video frames.

Figure 3A:
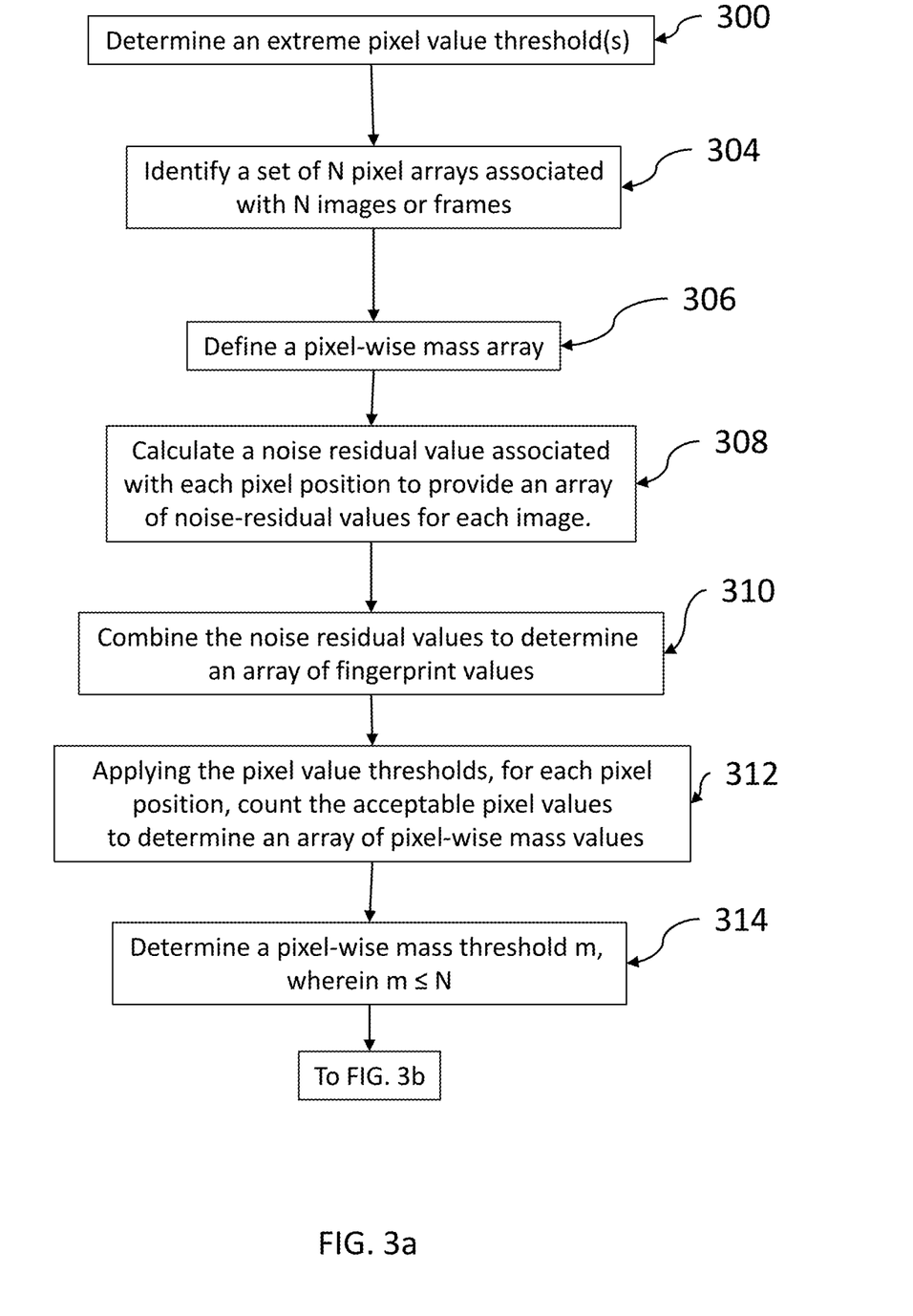
FIGS. 3a and 3b illustrate the steps of the present invention.
Figure 3B:
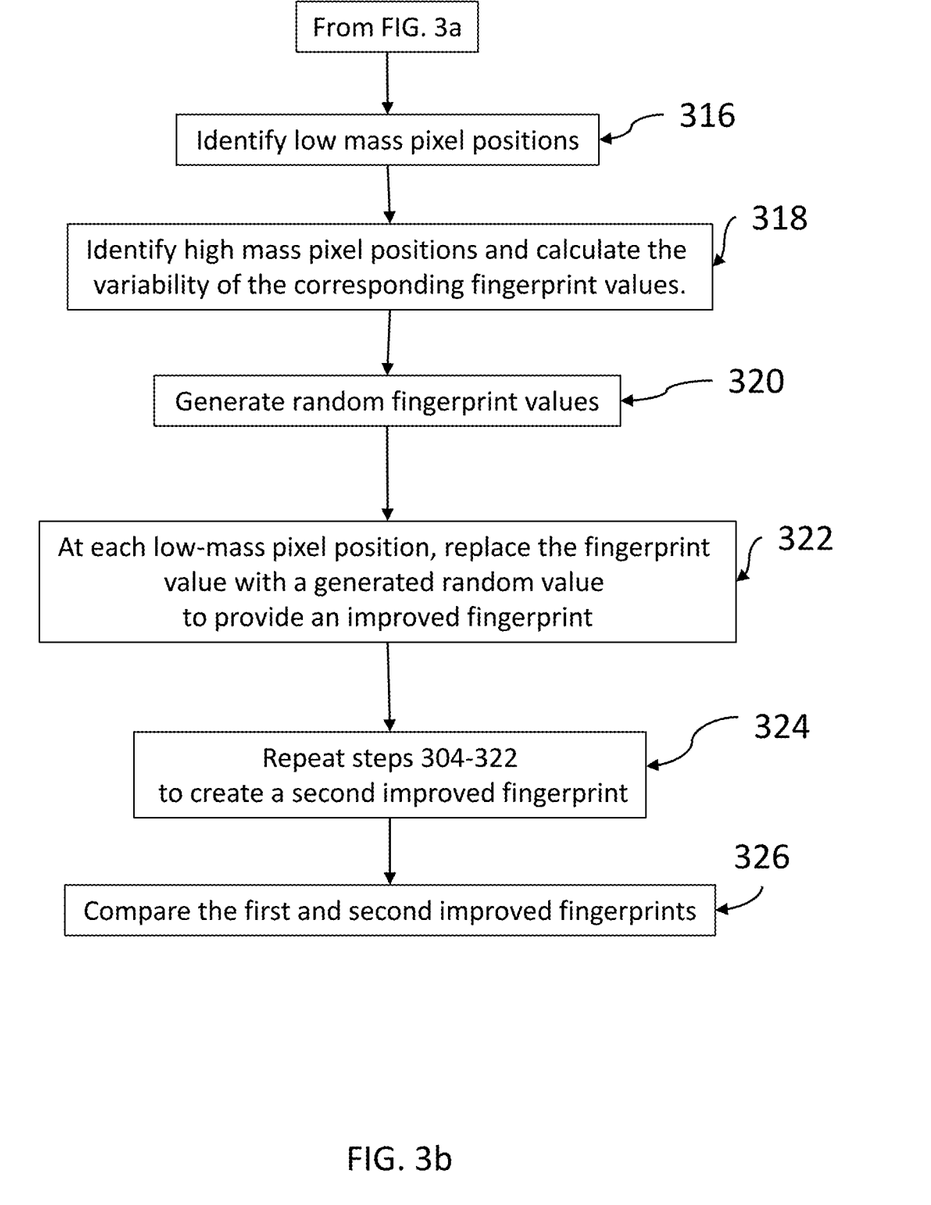

As noted above, because low-mass pixel positions do not behave in a known statistical distribution, too many low-mass pixel positions cause the fingerprint to be ill-formed. The present invention provides a method of creating an improved camera fingerprint from a set of images or frames by identifying the low-mass pixel positions and reducing the erroneous effects of the fingerprint values at these low mass pixel positions. The method of the present invention is illustrated in FIGS. 3a and 3b and includes steps 300 through 326.

At step 300, a pixel value threshold is determined to identify pixels of the image or frame which are unsuitable for inclusion in the fingerprint calculation. The pixel value threshold may be related to brightness. For example, the pixel values threshold may identify pixels which are too bright or too dark, by setting upper and lower extreme pixel values thresholds. Although the upper extreme pixel value threshold may be set as high as 255, a common upper extreme pixel value threshold is 250. Although the lower extreme pixel value threshold may be set as low as zero, a common lower extreme pixel value threshold is 60. The upper and lower extreme pixel value thresholds together define an acceptable range of pixel values. Alternatively the pixel value threshold may identify pixels which are too textured. In this case a limit based upon entropy may utilized as the threshold. Entropy typically ranges from 0 to 8. A threshold value may be set at 7 for example. Image regions with entropy greater than 7, therefore are too textured and do not fall within the acceptable range of pixel values used to estimate the camera fingerprint.

At step 304, a set of N pixel arrays associated with the set of N images or frames for which a fingerprint will be estimated are identified. The set may include a single image or frame and therefore N may be as low as one. No upper limit is provided for N. Each array provides pixel values corresponding to the image or frame.

At step 306, a pixel-wise mass array is defined having dimensions corresponding to the dimensions of the arrays of pixel values. Each position of the pixel-wise mass array corresponds to a pixel position and a pixel-wise mass counter is associated with each pixel position.

At step 308, utilizing the pixel values the noise residual value associated with each pixel position is calculated to provide an array of noise residual values for each of the N images or frames. Any one of several prior art methods for calculating the noise residual values may be used. For example, a common method of calculating noise residual values uses a wavelet-based denoiser. Other work flows could include different denoisers (e.g. total variation or bilateral filter). At step 310, the noise residual values of the noise residual value arrays are combined to provide an array of fingerprint values. Each fingerprint value is associated with a corresponding pixel position. Any one of several prior art methods for providing the array of fingerprint values may be used. For example, a common method of calculating fingerprint values uses a maximum likelihood estimator (MLE) as described by J. Fridrich in an article titled "Digital Image Forensic Using Sensor Noise" (2009). Other work flows could include the use of a simple average noise residual instead of a MLE.

At step 312, applying the extreme pixel value thresholds and utilizing the pixel-wise mass counters, for each pixel position, count the pixel values falling within the acceptable range, to determine an array of pixel-wise mass values.

At step 314, a pixel-wise mass threshold m is determined. In all cases, the pixel-wise mass threshold m will not exceed the fingerprint mass N (i.e., the pixel-wise mass m will be less than or equal to the fingerprint mass N). The pixel-wise mass threshold may be determined universally, e.g. set the pixel-wise mass threshold to 5. Alternatively, the pixel-wise mass threshold may be calculated relative to the fingerprint mass N, e.g. the pixel-wise mass threshold is set to 10% of the fingerprint mass N. For example, if 50 images are available to create the fingerprint, set the pixel-wise mass threshold to be 50*0.1=5.

The remaining steps of the present invention are illustrated at FIG. 3b. At step 316, each pixel position having a pixel-wise mass less than or equal to the pixel-wise mass threshold is identified. These pixel positions are identified as low-mass pixel positions.

At step 318, each pixel position having a pixel-wise mass greater than the pixel-wise mass threshold m is identified. These pixel positions are identified as high-mass pixel positions. A variability (e.g. statistical variance) in the fingerprint values corresponding to the high-mass pixel positions is estimated. Although any desired statistical distribution method may be used for estimating the variability, Gaussian and Uniform distribution methods have been found to work well. The type of distribution used to estimate the variability will be based upon the method selected at step 320 for generating random values.

For example, if at step 320 random fingerprint values will be generated using a Gaussian method, at step 318 a Gaussian distribution is used to estimate the variability. The Gaussian distribution is parameterized by mean $\mu$ and variance $\sigma^2$ Due to the way fingerprints are created, the mean $\mu$ of fingerprint values is equal to zero, therefore in order to generate appropriate Gaussian values, $\sigma^2$ must be estimated. Using the Gaussian distribution method, the variability of the fingerprint values is determined by the variance $\sigma^2$.

If at step 320 random fingerprint values will be generated using a Uniform method, at step 318 a Uniform distribution is used to estimate the variability. In order to generate values from a Uniform distribution, the ranges of values must be calculated. Using the Uniform distribution method, the variability of the fingerprint values is determined by the range.

At step 320, for each low-mass pixel position, a random fingerprint value is generated from the appropriate statistical distribution (e.g. Gaussian distribution) parameterized by the calculated variability.

At step 322, at each low-mass pixel position, replace the fingerprint value with one of the generated random values to provide an improved fingerprint.

At step 324, repeat steps 300-322 in connection with a second image or frame or set of images or frames to create a second improved camera fingerprint.

At step 326, compare the two improved camera fingerprints to determine if both fingerprints are associated with the same camera.

Although the invention has been described as a sequence of method steps 300-326, it is to be understood that many of these steps may occur in a different order without departing from the invention. For example, the determination of upper and lower extreme pixel values described as steps 300 and 302 may be determined after the pixel-wise mass array is defined at step 306; defining of the pixel-wise mass array at step 306 may be performed any time prior to step 312 when the pixel-wise mass values are determined; etc. In addition, some steps may occur simultaneously. For example, step 312 which provides for counting the acceptable pixel values is described as occurring subsequent to the step of combining the noise residual values. It is to be understood that the step of counting may occur simultaneously with the step of combining. It is further understood that not all steps described in connection with FIGS. 3a and 3b are required, for example, when repeating steps 300-322 at step 324, it is not necessary to again select a pixel-wise mass threshold m.

In an alternative method, at step 314 first and second pixel-wise mass thresholds $m_1$ and $m_2$ are selected. At step 316, low-mass pixel positions are identified utilizing the first pixel-wise mass threshold $m_1$. At step 318, high-mass pixel positions are identified using the second pixel-wise mass threshold $m_2$ and the variability of the corresponding fingerprint values is calculated. At step 320, for each low-mass pixel, a random fingerprint value is generated from the appropriate statistical distribution (e.g. Gaussian distribution) parameterized by the calculated variability. At step 322, at each low-mass pixel position, replace the fingerprint value with one of the generated random values to provide an improved fingerprint. An updated fingerprint is provided by the updated fingerprint values. This alternative method allows for greater refinement in identifying high and low mass pixel positions. Using this alternative method, only the fingerprint values associated with the pixel positions having a pixel-wise mass greater than $m_2$ are used to calculate the variability and only those fingerprint values associated with pixel positions having a pixel-wise mass less than $m_1$ are replaced with a generated random value. Those fingerprint values associated with pixel positions having a "medium" pixel-wise mass will be left undisturbed. In the event fingerprint values at these medium positions are accurate, the fingerprint values continue to impact the fingerprint estimate. In the event fingerprint values at these medium positions are inaccurate, the fingerprint values are not used in the calculation of variability.

As discussed above, prior art methods provided for masking of the extreme pixels by replacing the pixel values associated with the pixel positions having extreme pixel values with a value of zero. The zero values associated with these extreme pixel positions have no variability. As a result, the noise residuals associated with these extreme pixel positions are erroneously skewed and ultimately the estimated fingerprint is inaccurate, leading to fingerprint matching errors. Rather than masking by replacing extreme pixel values with zero, the invention utilizes all pixel values and noise residuals in calculating an array of fingerprint values. Masking in the current invention is limited to low-mass pixel positions. In addition, the invention does not provide masking by replacing pixel values with zero, rather the replacement values are randomly selected from an appropriate statistical distribution of values. As a result of the statistical distribution, the behavior of these low-mass pixels during the matching step is predictable and in essence the fingerprint values associated with the low-mass pixel positions do not make any contribution to the match determination. This lack of contribution to the match determination is preferable to the erroneous contribution provided by the prior art. This improved method of masking leads to better camera fingerprint matching performance in terms of fewer matching errors (i.e. fewer false matches and failed matches).

Care must be taken in selecting the pixel-wise mass threshold. If the threshold is set too high, too many of the fingerprint values associated with the low-mass pixel positions will be randomized. If the threshold is set too low, fingerprint values associated with extreme pixel values will be used in the estimated fingerprint. If either case occurs, the ability to match camera fingerprints accurately can be affected.

Figure 4A:
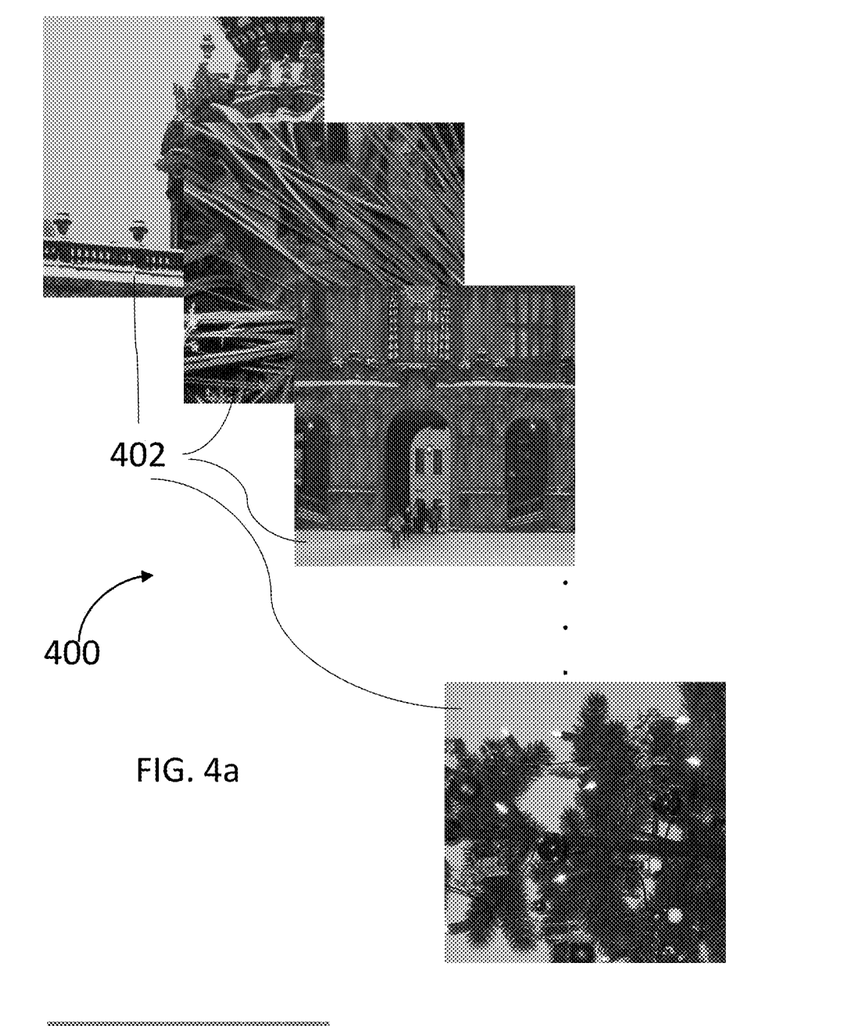
FIG. 4a illustrates a set of images used to create a camera fingerprint.
Figure 4B:
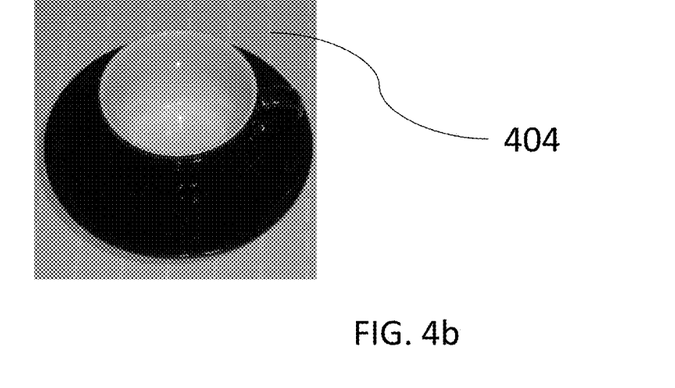
FIG. 4b illustrates a query image.
Figure 4C:
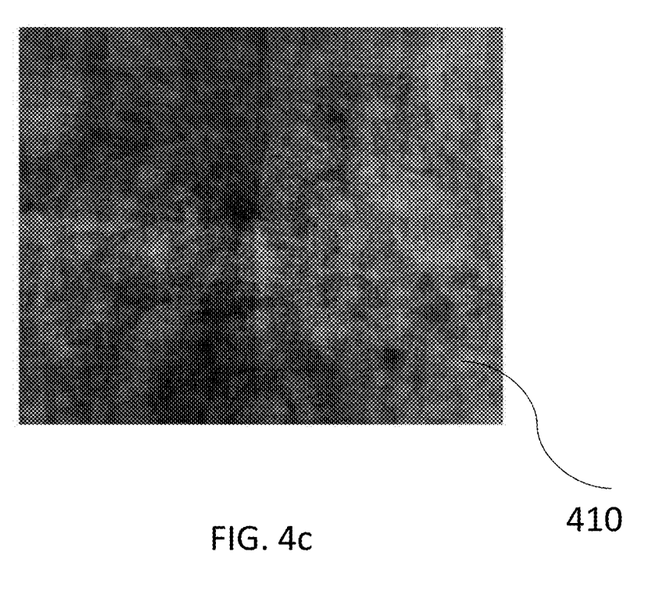
FIG. 4c is a heat map illustrating pixel-wise mass.

The effectiveness of the invention is demonstrated through a particular example illustrated in FIGS. 4a-4c. In this example, a peak-to-correlation energy (PCE) threshold of 60 was used to determine whether a query image matched a camera fingerprint. A set 400 of twenty-five images were taken with a Canon Ixus70 camera. Four images 402 of the set of twenty-five images are shown in FIG. 4a. An extreme pixel value threshold of 250 was set to identify pixels which were too bright and an extreme pixel value threshold of 60 was set to identify pixels where were too dark. Using prior art methods the noise residuals associated with each image and a camera fingerprint was calculated. All noise residuals associated with extreme pixel values exceeding the thresholds were masked from the noise residuals. i.e., for any extreme pixel values above 250 or below 60, the pixel value was replaced with a zero when calculating the noise residual values.

Next, a query image was taken with the same Canon Ixus70 camera. The query image 404 is illustrated in FIG. 4b. Although the images 402, 404 are illustrated in gray scale in FIGS. 4a and 4b, it is to be understood that this example employed the use of colored images. Again using a prior art method, the noise residuals associated with the query image 404 and a query fingerprint were calculated. As with the camera fingerprint, when calculating the query fingerprint, the extreme pixel values were masked from the query fingerprint.

Next, utilizing the camera fingerprint and the query fingerprint, a PCE score of 59 was calculated. Because this score falls below the PCE threshold of 60 it was determined that the query fingerprint did not match the camera fingerprint (i.e., it was determined that the query image was not produced using the same camera as the camera used to produce the camera fingerprint). Given that the query image was indeed produced using the same camera as the camera used to produce the camera fingerprint, this was a failed match.

Using the same set 400 of camera fingerprint images 402 and the same query image 404, the method of the present invention was used in an attempt to match the query image 404 to the camera fingerprint derived from the set of images 400. Again the PCE threshold was set at 60. An extreme pixel value thresholds were again set at 250 and 60. Specifically, an extreme pixel value threshold of 250 was set to identify pixels which were too bright and an extreme pixel value threshold of 60 was set to identify pixels where were too dark. Next, the twenty-five pixel arrays associated with the twenty-five images 402, were identified. Next, a pixel-wise mass array was defined. Specifically, given that each image 402 includes provides a 800×800 pixel array, the pixel-wise mass array was defined with the same dimensions. Next, the noise-residual value associated with each pixel position for each image was calculated to provide an array of noise-residual values for each image 402. These noise-residuals values were then combined to create an array of fingerprint values associated with the set of images 402.

Applying the extreme pixel value threshold, for each pixel position, the acceptable pixel values were counted and an array of pixel-wise mass values was determined for the set of images 400. A heat map 410 illustrating the pixel-wise mass for each pixel position associated with the set of images 400 is provided in FIG. 4c. Each pixel position is shaded in accordance with the pixel-wise mass associated with the pixel position. Those pixel positions having the highest pixel-wise mass are provided the darkest shading and those pixel positions having the lowest pixel-wise mass are provided the lightest shading. Given that twenty-five images 402 were included in the set of images 400, the pixel-wise mass values range from 0 to 25. Pixel-wise mass values of 0 are illustrated in FIG. 4c as white pixels in the heat map 410 and pixel-wise mass values of 25 are illustrated in in the heat map 410 as black pixels. It is noted that there is no clear clustering of the white pixels in the heat map 410. The lack of clear clustering may be due to the fact that subject of each image of the set 402 is unique.

Next, a pixel-wise mass threshold, m, was determined. Specifically, the pixel-wise mass threshold was set to 10. Those pixel positions having a pixel-wise mass less than the threshold m (i.e. less than 10) were identified as low mass pixel positions. Those pixel positions having a pixel-wise mass greater than or equal to the threshold m (i.e. greater than or equal to 10) were identified as high mass pixel positions.

Next, a variability (e.g. statistical variance) in the fingerprint values corresponding to the high-mass pixel positions was estimated. Specifically, a Gaussian distribution method in which the mean $\mu$ of fingerprint values is equal to zero was used to estimate the statistical variance $\sigma^2$. Utilizing this statistical variance, for each low-mass pixel position, a random fingerprint value was generated and the previously calculated fingerprint value was replaced with the random fingerprint value to provide an improved fingerprint.

Next, an improved fingerprint was calculated for the query image 404 in the same manner as the improved camera finger print was calculated for the set 400 of camera images 402.

Using PCE to compare the camera fingerprint to the query image fingerprint, it is determined that the new PCE score is 62. Applying the PCE threshold of 60, the query image fingerprint is now correctly found to match the camera fingerprint. As discussed above, when constructing a fingerprint by masking the values associated with extreme pixel values, the fingerprint values associated with low-mass pixels are ill-formed. Therefore, when comparing to the query image fingerprint, those low-mass pixel locations will fail to match and the penalty for failing to match will contribute to a low PCE score. By replacing the fingerprint values associated with the low-mass pixels with a randomized value, the penalty for failing to match the extreme pixel values is diminished, thereby increasing the PCE score. As illustrated in the example used, even when the problem of extreme pixel values is not exacerbated by fingerprint images having similar characteristics, the invention improves fingerprint matching.

While embodiments of the present invention are shown and described, it is envisioned that those skilled in the art may devise various modifications of the present invention without departing from the spirit and scope of the appended claims.

The invention claimed is:

1. A method of creating a fingerprint from a set of pixel arrays,
   each pixel array associated with an image or video frame and each pixel array providing a plurality of pixel values associated with a plurality of pixel positions, the method including the steps of:
   determining an extreme pixel value threshold;
   for each image or frame, utilizing the pixel values calculate a noise residual value associated with each pixel position to provide a set of noise residual arrays;
   for each pixel position combine the noise residual values to calculate a fingerprint value associated with each pixel position;
   applying the extreme pixel value threshold to determine a pixel-wise mass for each pixel position and to provide an array of pixel-wise mass values;
   determining a pixel-wise mass threshold;
   applying the pixel-wise mass threshold to identify high-mass pixel positions and measure a variability of the fingerprint values associated with the high-mass pixel positions;
   applying the pixel-wise mass threshold to identify low-mass pixel positions;
   for each low mass pixel position, using statistical distribution parameterized by the measured variability, generate a random fingerprint value; and
   replacing the fingerprint value associated with each low mass pixel position with said generated random fingerprint value to provide an improved fingerprint.

2. The method of creating a fingerprint according to claim 1, wherein said extreme pixel value threshold relates to brightness.

3. The method of claim 2, wherein the step of determining an extreme pixel value threshold includes the determining an upper extreme pixel value threshold and determining a lower extreme pixel value threshold and said step of applying the extreme pixel value threshold includes applying said upper extreme pixel value threshold and applying said lower extreme pixel value threshold.

4. The method of claim 3, wherein said upper extreme pixel value threshold is 250.

5. The method of claim 3, wherein said lower extreme pixel value threshold is 60.

6. The method of claim 2, wherein said extreme pixel value threshold relates to texture.

7. The method of claim 6, wherein said extreme pixel value threshold is provided by an entropy value of 7.

8. The method of claim 1, further including the step of:
   repeating the steps of claim 1 to create a second improved fingerprint from a second set of images or frames; and
   comparing the improved fingerprint with said second improved fingerprint to determine whether said fingerprints match.

9. The method of claim 1, wherein the pixel-wise mass threshold is an absolute value.

10. The method of claim 1, wherein the pixel-wise mass threshold is a percentage of a fingerprint mass.

11. The method of claim 1, wherein said statistical distribution is Gaussian.

12. The method of claim 1, wherein said statistical distribution is Uniform.

13. The method of claim 1, wherein said pixel-wise mass threshold is provided by a first pixel-wise mass threshold and a second pixel-wise mass threshold;
   wherein said high-mass pixel positions are identified applying said first pixel-wise mass threshold, and
   wherein said low-mass pixel positions are identified applying said second pixel-wise mass threshold.

* * * * *